US007941846B2

(12) United States Patent
Bejean

(10) Patent No.: US 7,941,846 B2
(45) Date of Patent: May 10, 2011

(54) METHOD OF SECURING THE LEARNING MODE OF A HOME AUTOMATION DEVICE

(75) Inventor: Alain Bejean, Grussy (FR)

(73) Assignee: Somfy SAS, Cluses (FR)

( * ) Notice: Subject to any disclaimer, the term of this patent is extended or adjusted under 35 U.S.C. 154(b) by 1044 days.

(21) Appl. No.: 10/532,895

(22) PCT Filed: Nov. 7, 2003

(86) PCT No.: PCT/IB03/05073
§ 371 (c)(1),
(2), (4) Date: Dec. 30, 2005

(87) PCT Pub. No.: WO2004/044863
PCT Pub. Date: May 27, 2004

(65) Prior Publication Data
US 2006/0153383 A1 Jul. 13, 2006

(30) Foreign Application Priority Data
Nov. 12, 2002 (FR) ..................................... 02/14093

(51) Int. Cl.
*G06F 12/14* (2006.01)
*G08B 13/00* (2006.01)

(52) U.S. Cl. ....... 726/20; 340/5.23; 340/5.24; 340/5.64; 340/5.71

(58) Field of Classification Search ..................... 726/20
See application file for complete search history.

(56) References Cited

U.S. PATENT DOCUMENTS

| | | | | |
|---|---|---|---|---|
| 4,855,713 | A | 8/1989 | Brunius | |
| 5,408,217 | A | 4/1995 | Sanderford, Jr. | |
| 5,471,190 | A * | 11/1995 | Zimmermann | 340/310.11 |
| RE35,364 | E * | 10/1996 | Heitschel et al. | 700/90 |
| 5,686,904 | A * | 11/1997 | Bruwer | 340/5.23 |
| 5,751,224 | A * | 5/1998 | Fitzgibbon | 340/825.72 |
| 5,864,297 | A * | 1/1999 | Sollestre et al. | 340/5.23 |
| 5,986,571 | A * | 11/1999 | Flick | 340/825.72 |
| 6,191,701 | B1 * | 2/2001 | Bruwer | 340/5.22 |
| 6,975,617 | B2 * | 12/2005 | Walker et al. | 370/349 |
| 7,503,066 | B2 * | 3/2009 | Tatebayashi et al. | 726/17 |
| 2004/0061591 | A1 * | 4/2004 | Teich | 340/5.24 |
| 2004/0177279 | A1 * | 9/2004 | Domenz et al. | 713/202 |

FOREIGN PATENT DOCUMENTS

EP 0867848 9/1998

(Continued)

OTHER PUBLICATIONS

English translation of abstract of JP 09-256702.

(Continued)

*Primary Examiner* — Matthew T Henning
(74) *Attorney, Agent, or Firm* — Husch Blackwell LLP

(57) ABSTRACT

A method of securing the learning mode of a device includes an assembly of at least one command transmitter, communicating with a command receiver capable of driving an element providing for the security and/or the comfort of a building and capable of being switched to learning mode by one or more activation functions, wherein one or more actions of which at least one is applied to a particular command transmitter of the assembly, termed secure, causes the disabling of at least one function of activation of the learning mode of the command receiver.

11 Claims, 5 Drawing Sheets

FOREIGN PATENT DOCUMENTS

| | | |
|---|---|---|
| EP | 0921507 | 6/1999 |
| FR | 2727553 | 5/1996 |
| JP | 09-256702 | 9/1997 |
| JP | 2001032587 | 2/2001 |
| JP | 2002-188363 | 7/2002 |
| WO | WO92/15977 * | 9/1992 |

OTHER PUBLICATIONS

English translation of abstract of JP 2002-188363.

* cited by examiner

METHOD OF SECURING THE LEARNING MODE OF A HOME AUTOMATION DEVICE

FIELD OF THE INVENTION

The invention relates to a method of securing according to the preamble of claim 1. The invention pertains also to a device intended to implement the method according to the invention.

BACKGROUND

The expression command transmitter is understood to mean any element capable of transmitting a command by any means and in particular by using an electromagnetic signal, for example of radiofrequency or infrared type, or by using an electrical signal.

In devices allowing the driving of comfort and/or security elements, when the command transmitters and the command receivers communicate remotely, it is necessary to pair them. This pairing is carried out by the implementation of a procedure of identification and of learning of the transmitters, which will be associated with the receivers so as to allow the remote control of the actuators associated with the receivers.

PRIOR ART

Such a procedure is described in patent EP 0 867 848. The device allowing the implementation of this procedure comprises two transmitters each possessing an identity number and transmitting a signal comprising this number and a command. The device also comprises a receiver furnished with a logic unit exhibiting a microprocessor and a memory. The microprocessor is capable of operating according to two modes. A first in which it allows the execution of the commands received and a second in which it allows the recording of the identity numbers of the transmitters. Another procedure is also known from the document FR 2 727 553.

A means of switching to learning mode such as a pushbutton situated on the receiver can act directly on the microprocessor. This means of switching to learning mode of the microprocessor can also be associated with a transmitter, so that by means of this transmitter, it is possible to switch the microprocessor to learning mode and to record the identity number of at least one other transmitter. In the case of a wireless transmitter, the identity number of this transmitter must be known to the microprocessor in order to be able to activate the switching to learning mode. The recording into memory of the identity number of the transmitter comprising the means of switching to learning mode may be performed prior to installation, in the factory for example. This recording into memory (or pairing) may also occur at the time of installation by the activation of a function for switching into learning mode of the microprocessor at the level of the receiver as described previously. This function is no longer necessarily accessible once the device has been completely installed.

In the case where the means of switching to learning mode is accessible solely on a transmitter, problems arise upon the loss or theft of this transmitter. On the one hand, it is no longer possible to associate transmitters with or to remove transmitters from the device and, on the other hand, in the case of a theft, the device is no longer secure.

A easy solution making it possible to solve these problems is described in patent EP 0 921 507. It consists in ordering the switching into learning mode through a specific action on the mains supply, for example a double cutout of current within a reduced time interval.

This solution makes easier the pairing between transmitters and receivers exhibits a lack of security of access to the memory of the receivers.

Specifically, if one takes the example of a gate or a garage, far from the main building and the door of which is controlled by a remote control system, there exist unsecure accessways to the mains supply, between the gate or the garage and the main building. These accessways may be used to act in a fraudulent manner on the mains supply, in such a way as to switch the receiver of the remote control system to learning mode and to pair a new transmitter.

Another case of unsecure access is the following: switches are found situated at the level of the receiver, in particular in garage door actuator systems. An action on this switch activates the learning mode of the receiver. In the case of a garage door left open temporarily, access to the switch is unrestricted and the latter can be used for fraudulent purposes for the pairing of a new transmitter.

The methods and the means allowing the switching of the device to learning mode according to the prior art are represented in FIGS. 1 and 2.

In FIG. 1, the command receiver is initialized upon the installation of the device. The initialization phase also comprises the procedures for pairing one or more transmitters in the course of which the receiver receives the identity number of the transmitter or transmitters and stores them in memory.

To switch the receiver to learning mode, a user performs, on a transmitter already known by the command receiver, an action A1 for switching to learning mode, for example by pressing a specific button provided on this transmitter. The transmitter generates and sends a programming message containing its identity number ID and a programming code allowing the switching of the receiver to learning mode.

Upon the reception of the message originating from the command transmitter, the receiver checks whether the identity number ID received is in memory. If such is the case, the command receiver is ready to receive messages for controlling the actuator from the transmitter. In the case where a programming code is received, the receiver switches to learning mode. It is then possible to pair new transmitters or to remove some. Exit from the learning mode follows either the end of a timeout, or a new order from the user.

Another procedure for switching to learning mode of the receiver, known from the prior art, is represented in FIG. 2. This procedure is initiated by an action A2 of the user on a means of switching to learning mode associated directly with the receiver or by a specific action on the mains supply.

A solution proposing to use independent units to reprogram the system managing the opening of the doors of a vehicle is known from patent JP 2001032587. This solution is aimed at securing the system with respect to the theft of the transmitters, but does not solve the problem of access to the fixed means of switching to learning mode in the procedures for pairing between transmitters and receivers.

SUMMARY OF THE INVENTION

The aim of the invention is to provide a method making it possible to solve the aforesaid problems and to improve the methods of the prior art. In particular, the invention proposes to implement a method making it possible to secure access to the learning functions of the command receivers within the framework of devices providing for the security and/or the comfort of a building. The invention also proposes to embody a device making it possible to implement this method.

It is therefore possible to distinguish three types of transmitters which may communicate with the command receiver of the device:

- a simple control transmitter (up/down, open/close),
- a programming transmitter (control and function for activating the learning mode of the receiver),
- a secure command transmitter (optional control, functions for activating the learning mode and disabling).

The two main functions of the secure command transmitter are therefore the switching into learning mode of the receiver and the disabling of the learning mode activation functions. These main functions are activated either by different actions, or by a common action on one or more transmitters having means of switching to learning mode and means of disabling of the activation functions.

Preferably, the secure command transmitters comprise wireless means of remote communication with the command receiver.

The secure command transmitters preferably have two dimensions substantially equal to the standardized dimensions of a sheet of paper so as to be able to be kept easily in a safe place such as a strongbox. They may also be furnished with visual means such as labels so as to indicate to the user with which devices they are associated.

The device comprises a transmitter whose functions are the switching into learning mode of the device and the sending of a secure code and a receiver such that the receiving of the secure code causes the disabling of the other means (one or more) of switching to learning mode.

The device can be used in a preventive manner. Once the desired pairings between transmitters and receivers have been performed, the secure code can be sent to the receiver, by virtue of the secure transmitter, in such a way as to limit its possibilities of switching into learning mode.

The secure transmitter does not necessarily include any function for controlling the actuator. In this way, it can consist of a simple transmitter, that is cheaper and easier to house in a safe place. However, provision may be made for a secure transmitter associated with a more advanced transmitter, which could possibly be fixed to the interior of the residence.

The secure transmitter can allow a one-off disabling, that is to say an irreversible cancellation of the means (one or more) for switching into learning mode. A function for reactivating the various means for switching into learning mode may also be provided on the secure transmitter. In both cases, the secure transmitter can be reused for the receiver learning mode activation function.

Provision may also be made for a function for erasing the identity numbers already recorded, for example by a special maneuver on the secure transmitter.

BRIEF DESCRIPTION OF THE DRAWINGS

The appended drawing represents, by way of examples, several modes of execution of the method according to the invention.

DETAILED DESCRIPTION

Figure 6:
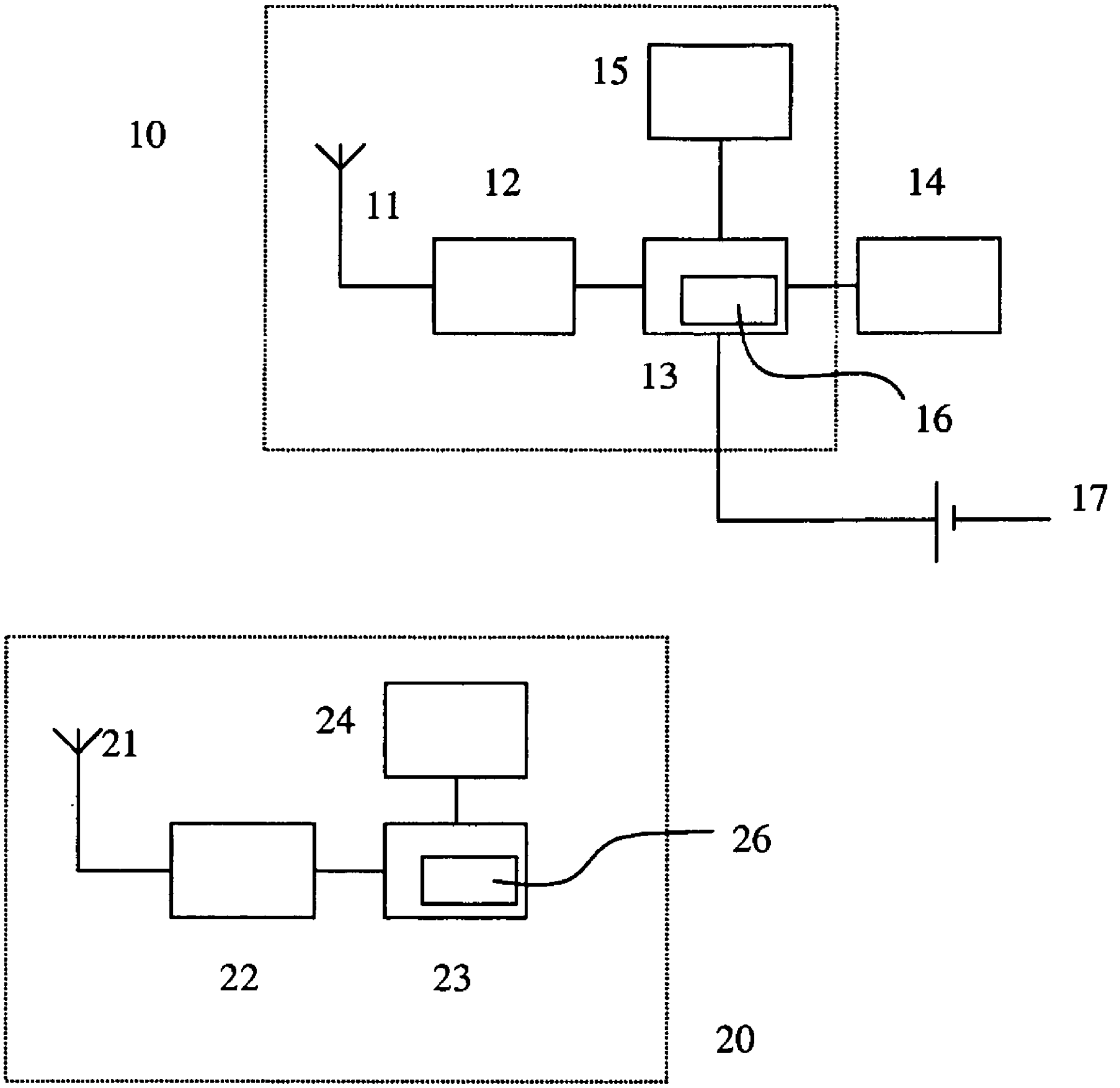
FIG. 6 is a diagram representing a command transmitter and a command receiver.

The device represented in FIG. 6 allows the implementation of the method according to the invention. It comprises a command receiver 10 and an assembly of command transmitters 20. For simplicity, a single transmitter has been represented in FIG. 6.

The command receiver 10 comprises a receiver module 12 linked, on the one hand, to a coupling device 11 and, on the other hand, to a processing unit 13 of microcontroller type driving a rig 14 such as a door, a rolling shutter or an alarm installation. The command receiver can also comprise a control interface 15 of pushbutton type. The command receiver is connected to a mains supply 17.

The processing unit 13 comprises a memory area 16 intended to contain programs for operating the receiver 10 and the identity numbers of the command transmitters 20 from which the receiver 10 may receive commands.

Each command transmitter 20 comprises a transmitter module 22 linked, on the one hand, to a coupling device 21 and, on the other hand, to a processing unit 23 of microcontroller type, and a control interface 24 of keypad type. Each command transmitter 20 contains its identity number in a memory area 26 of the processing unit 23.

The command transmitters are able to send commands by way of electromagnetic waves, of radio type or of infrared type or else by way of wire links.

The communications between command transmitters and command receivers may be bidirectional. In this case, transmitters and receivers are furnished with "transmitter/receiver" modules.

The command transmitters, or at least some of them, may by an action or a series of actions of the user make the receiver switch to a learning mode in which it is possible to modify the list of the transmitters which are paired with it through their addition or removal.

Among the command transmitters, a particular transmitter, the so-called secure command transmitter, makes it possible to disable certain functions of switching into learning mode of the receiver.

Figure 3:
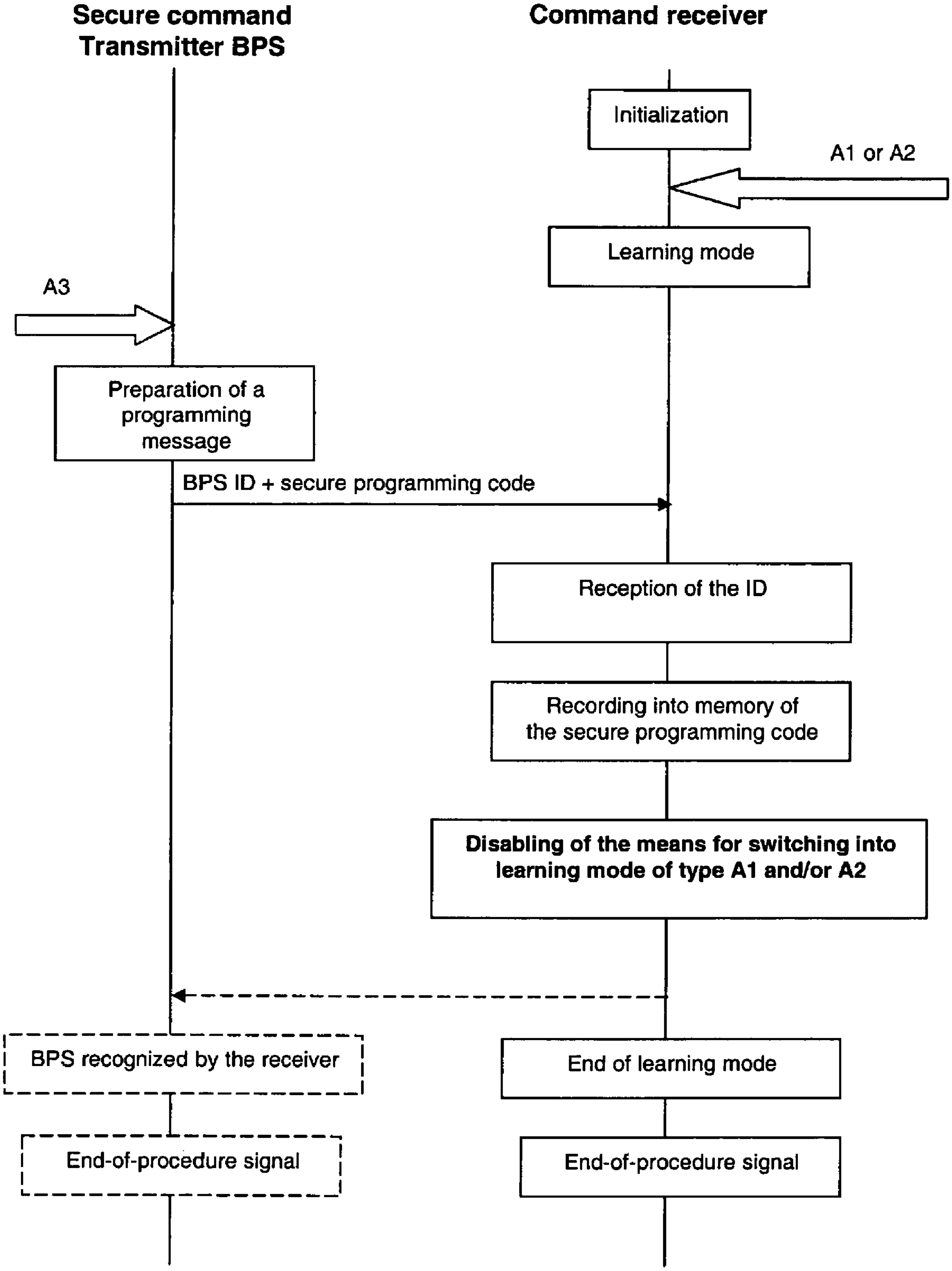
FIG. 3 is a flowchart of a first mode of execution of the method of securing the learning mode upon a first use of the secure command transmitter.

FIG. 3 represents a first mode of execution of the method of operation of the device upon a first use of the secure command transmitter.

The first action consists in switching the receiver into learning mode by a command of type A1 (by a command transmitter) or of type A2 (directly at the level of the receiver or on the mains supply). The user can then activate a secure program run command A3 which causes the sending of a message containing the identity number ID of the secure transmitter BPS, so as to pair it with the receiver, possibly a programming code and the secure programming code.

The receiver recognizes the identity number ID of the transmitter.

The reception of the secure programming code causes the running of an associated security program and, consequently, the disabling of the means of switching into learning mode of type A1 and/or of type A2.

This disabling of the means of switching into learning mode may consist of a change of state of binary memories associated with the receiver and enabling or otherwise the means of switching into learning mode by the various transmitters.

The receiver can then activate an end-of-procedure signal informing the user that the means of switching into learning mode have been disabled. This signal may also be transmitted by the secure command transmitter after reception of a message transmitted by the receiver, in the case where the communication is bidirectional.

In such a mode of execution, the functions for switching into learning mode and for disabling may either be common to one and the same action on the secure command transmitter, or differentiated.

In the first case, the reception of the programming code does not affect the receiver which is already in learning mode. Possibly, in the case of an end of learning mode following the end of a timeout, the latter may be reinitialized following the reception of a programming code by the command receiver.

In the second case, the programming code is not sent by the secure command transmitter.

Figure 4A:
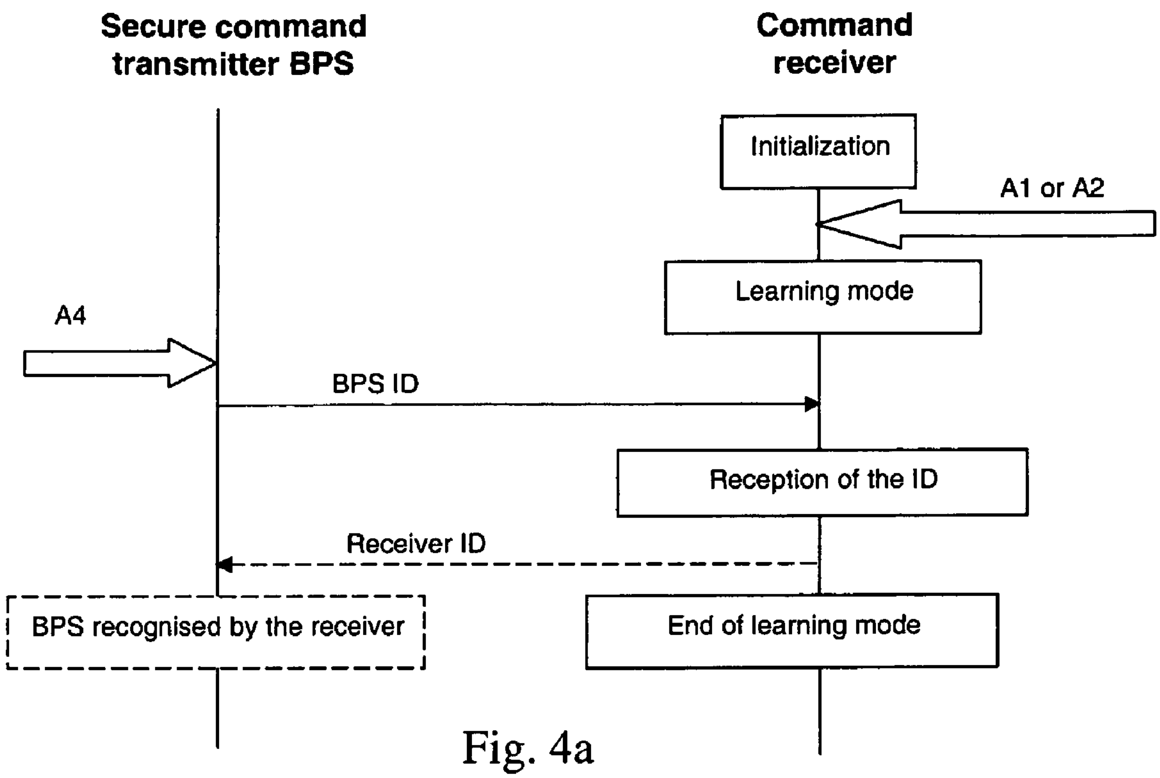
FIGS. 4*a* and 4*b* are two parts of a flowchart of a second mode of execution of the method of securing the learning mode upon a first use of the secure command transmitter.
Figure 4B:
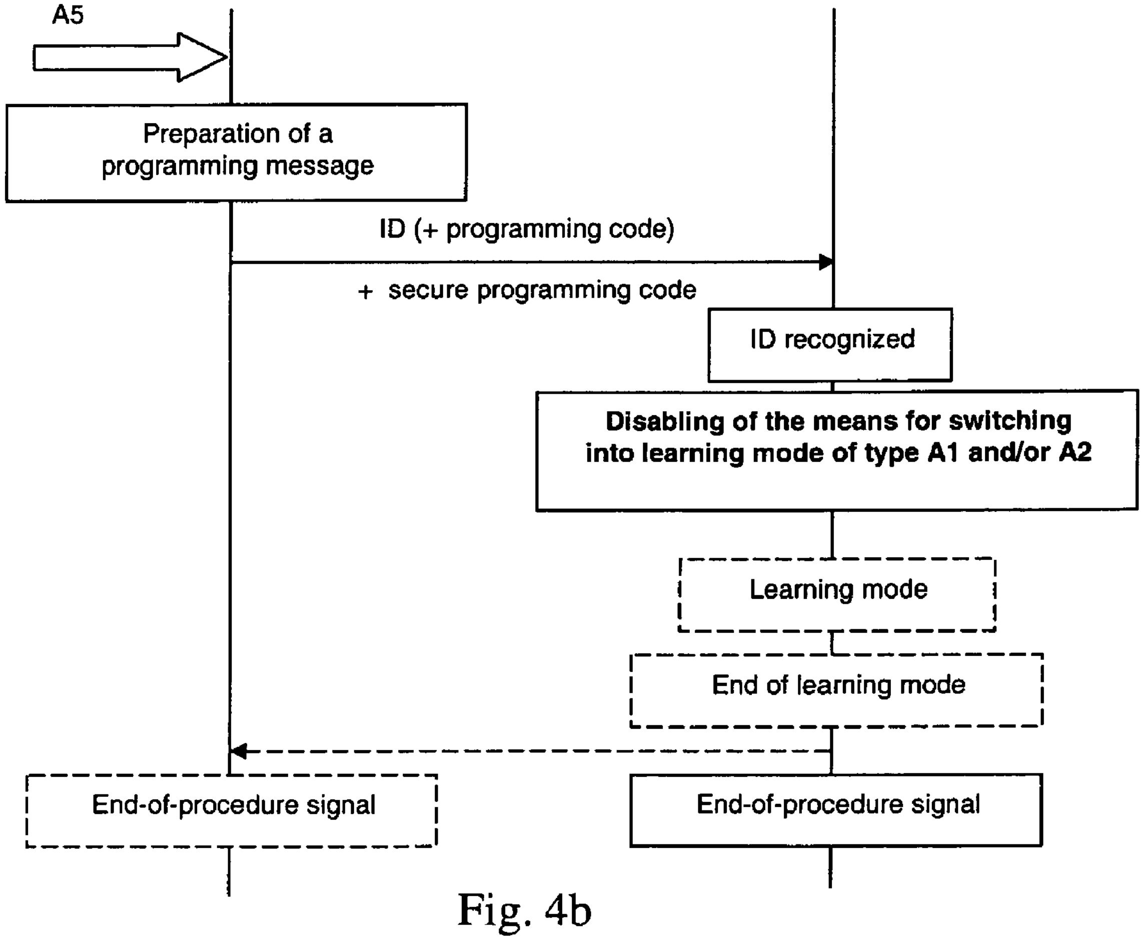

FIGS. 4*a* and 4*b* represent a second mode of execution of the method of operation of the device upon a first use of the secure command transmitter, when the functions of identification of the secure command transmitter and the disabling command are decoupled. In this case, two specific actions have to be performed on the secure command transmitter by the user. These two actions may be staggered over time.

FIG. 4*a* represents the method of pairing the secure command transmitter. A first action A4, performed while the receiver has previously been switched into learning mode, makes it possible to pair the secure command transmitter and the command receiver. It causes the sending solely of the identity number ID of the secure command transmitter and its reception and its storage by the command receiver.

FIG. 4*b* represents the operation of the secure command transmitter once it is known to the receiver. A second action A5 causes the sending of a message containing the identity number ID of the secure command transmitter, possibly a programming code and a secure programming code. The identity number of the transmitter having been recorded in the receiver during the previous action, the latter is recognized by the receiver and the secure programming code is stored in memory causing the running of the security program associated with this code. The means for switching into learning mode of type A1 and/or of type A2 are consequently disabled.

When the functions for switching into learning mode and for disabling are common to a type of action on the secure command transmitter, the reception of the programming codes brings about in a substantially simultaneous manner the switching into learning mode of the receiver and the disabling of the learning mode activation functions.

In a general manner, the disabling function involves the disabling of the learning mode activation functions, with the exception of the secure command transmitter's learning mode activation function.

Figure 1:
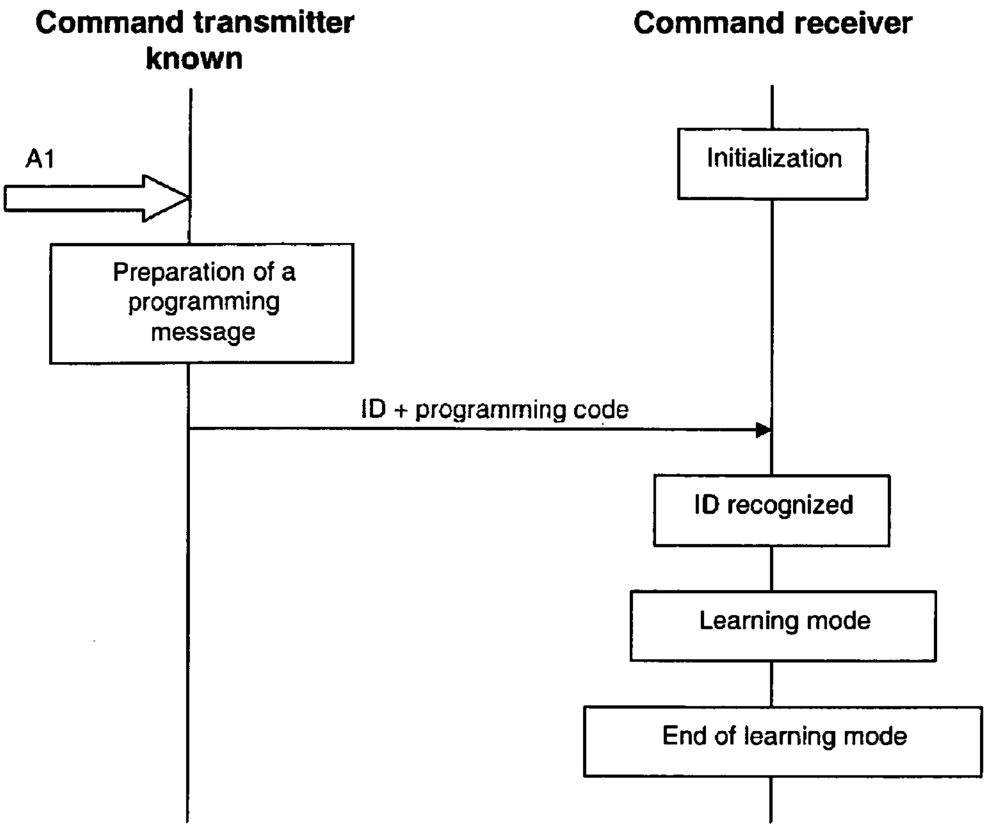
Fig. 1 (Prior art)
FIG. 1 is a flowchart of a method of switching to learning mode according to the prior art.
Figure 2:
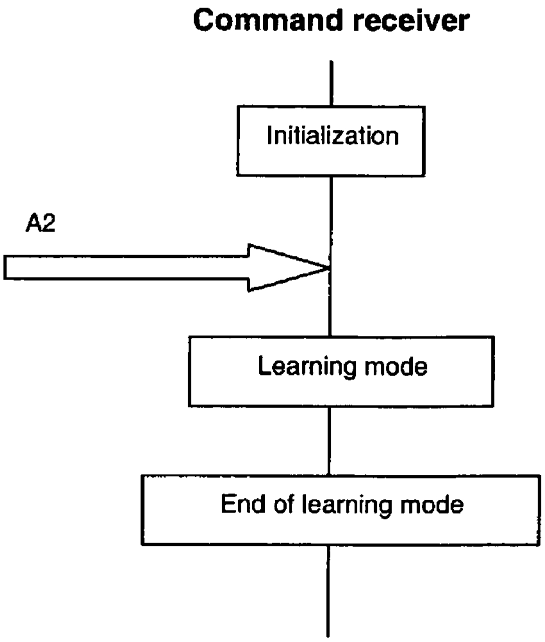
Fig. 2 (Prior art)
FIG. 2 is a flowchart of another method of switching to learning mode according to the prior art.

In the case where the two functions for switching into learning mode and disabling have to be activated by two differentiated types of action, an action brings about a switching into learning mode of the command receiver, in the manner represented in FIG. 1 and an action brings about the sending of the identity number ID of the secure command transmitter and of the secure programming code solely. Thus, only the disabling function is activated.

As in the previous mode of execution, the receiver can then activate an end-of-procedure signal informing the user that the means for switching into learning mode have been disabled. This signal may also be transmitted by the secure command transmitter after reception of a message transmitted by the receiver, in the case where the communication is bidirectional.

There exist several cases for which the secure command transmitter is activated although its identity number ID is already known to the receiver:

- upon a first use, in the case of FIG. 4*b*, if the secure command transmitter has been paired to the command receiver without any programming code or secure programming code being sent simultaneously,
- or upon a subsequent use of the secure command transmitter, for the switching into learning mode of the device,
- or if means are provided for reactivating the original means for switching into learning mode.

Figure 5:
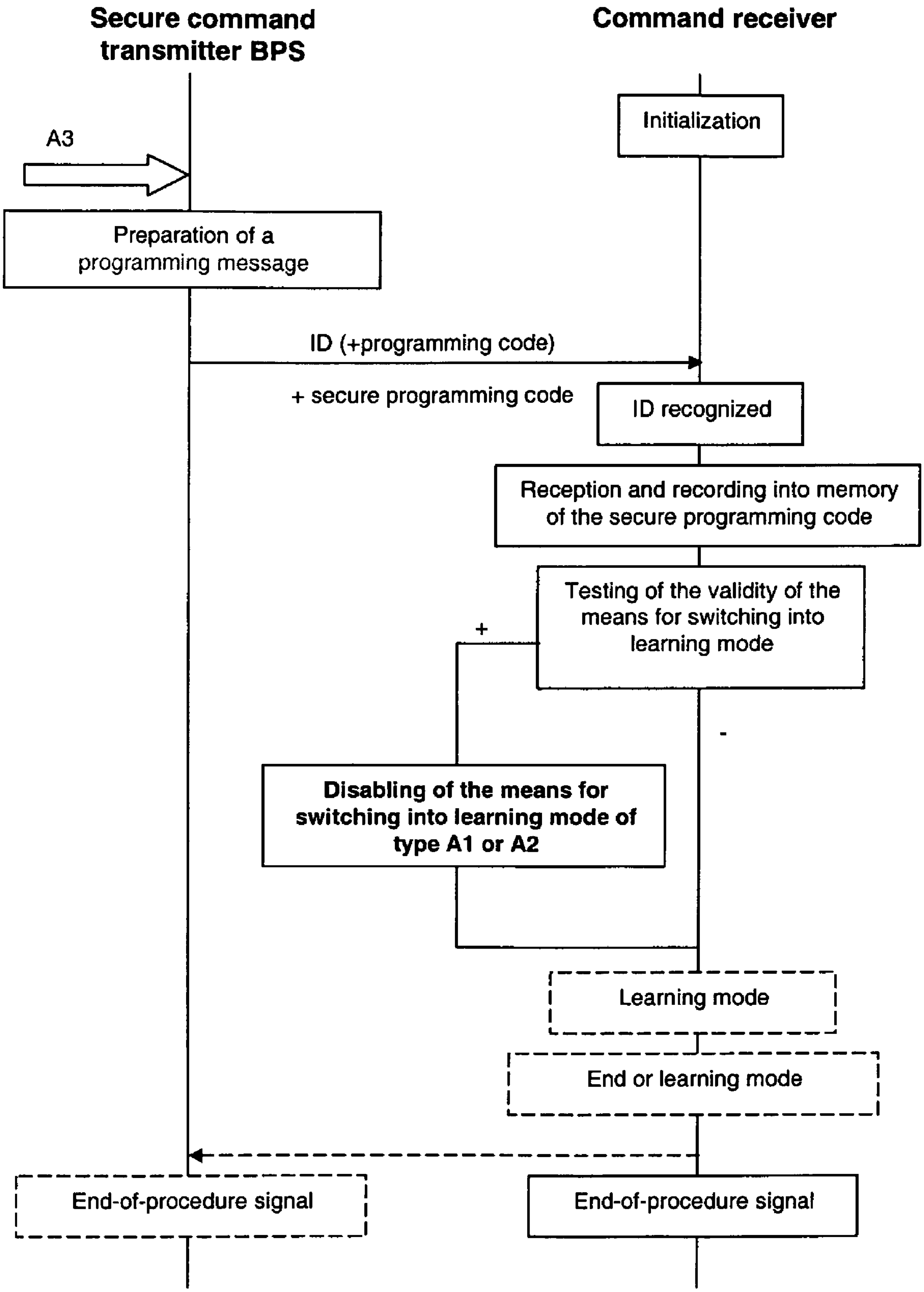
FIG. 5 is a flowchart of the first mode of execution of the method of securing the learning mode upon a subsequent use of the secure command transmitter.

FIG. 5 represents the method implemented when the command transmitter is known to the receiver, upon a subsequent use. Through an action A3 on the secure transmitter, the user causes the sending of a message containing the identity number ID of the secure command transmitter, possibly the programming code, and the secure programming code. The receiver receives this message, recognizes the identity number ID of the secure command transmitter and stores the secure programming code.

It is possible to provide a test to ascertain whether the means for switching into learning mode are enabled for example by testing the state of binary memories. If the means for switching into learning mode are enabled (test positive +), the receiver disables them before recording this configuration. It may possibly then switch to learning mode. If the means of switching into learning mode are already disabled (test negative −), the receiver can then switch to learning mode, in such a way as to be able to initiate a pairing procedure.

This test is optional and solely avoids the need to resend a disable command to already disabled means for switching into learning mode, in particular in the case where a single action on the secure command transmitter brings about both the switching into learning mode of the receiver and the disabling of other functions of activation of this learning mode.

Of course, in all the modes of execution of the invention, the sending of an identity number may be replaced by any other identification process, such as for example a Challenge process.

Likewise, provision may also be made for the secure programming code to be replaced by a generic part of the identity number of a secure command transmitter, which characterizes the secure command transmitter and the associated disabling function.

Specific embodiments of a method of securing the learning mode of a home automation device according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A method of securing a learning mode of a device, the device including a secure first command transmitter and a command receiver, the command receiver being capable of driving an element providing for at least one of the security and the comfort of occupants of a building, the method comprising:

providing at least one first activation function for switching the command receiver to the learning mode, the first activation function being associated with the secure first command transmitter;

providing at least one second activation function for switching the command receiver to the learning mode, the second activation function being associated with at least one of the command receiver, a second command transmitter, and a main power supply;

applying at least one action to the secure first command transmitter;

the application of the at least one action to the secure first command transmitter causing a disabling of the second activation function for switching the command receiver to the learning mode;

the disabling of the second activation function preventing the command receiver from being switched to the learning mode by the second activation function; and maintaining a capability of the secure first command transmitter to switch the command receiver to the learning mode via the first activation function after the disabling of the second activation function.

2. The method of securing as claimed in claim 1, wherein the at least one action comprises at least a first action that is undertook on at least one secure command transmitter and successively or simultaneously at least a second action that is undertook on at least one other command transmitter.

3. The method of securing as claimed in claim 1, wherein the at least one action on the secure command transmitter activates the learning mode of the receiver.

4. The method of securing as claimed in claim 1, wherein the at least one action on the secure command transmitter disables the at least one activation function of the learning mode with the exception of the at least one activation function of the secure command transmitters.

5. The method of securing as claimed in claim 1, wherein the disabling of the activation function is irreversible.

6. The method of securing as claimed in claim 1, wherein the disabling of the activation function is temporary.

7. The method of securing as claimed in claim 1, wherein an action on a secure command transmitter causes, in the memory of the receiver, the erasure of the identity numbers of at least certain transmitters.

8. A device comprising: at least one secure command transmitter, and possibly other command transmitters, communicating with a command receiver capable of driving an element providing for the security and/or the comfort of a building, and implementing the method as claimed in claim 1.

9. A device as claimed in claim 8, wherein the secure command transmitters comprise wireless means of remote communication with the command receiver.

10. The device as claimed in claim 9, wherein the secure command transmitters have two dimensions small enough so that the secure command transmitters are capable of being stored in a strongbox.

11. The device as claimed in claim 8, wherein the secure command transmitters have two dimensions small enough so that the secure command transmitters are capable of being stored in a strongbox.

* * * * *